US008706150B2

(12) United States Patent
Park et al.

(10) Patent No.: US 8,706,150 B2
(45) Date of Patent: Apr. 22, 2014

(54) METHOD AND APPARATUS FOR POWER CONTROL IN A WIRELESS COMMUNICATION SYSTEM

(75) Inventors: Jeong-Ho Park, Seoul (KR); Hwa-Sun You, Suwon-si (KR); Hyun-Kyu Yu, Seoul (KR); Won-Il Roh, Yongin-si (KR); Ho-Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 918 days.

(21) Appl. No.: 12/718,551

(22) Filed: Mar. 5, 2010

(65) Prior Publication Data
US 2010/0227638 A1 Sep. 9, 2010

(30) Foreign Application Priority Data

Mar. 6, 2009 (KR) .................. 10-2009-0019409
Jan. 8, 2010 (KR) .................. 10-2010-0001991
Mar. 5, 2010 (KR) .................. 10-2010-0019733

(51) Int. Cl.
*H04B 7/00* (2006.01)
(52) U.S. Cl.
USPC ..... 455/522; 455/412.1; 455/420; 455/456.1; 370/281; 370/282; 370/295
(58) Field of Classification Search
USPC ............ 455/522, 69, 403, 412.1, 412.2, 418, 455/420, 422.1, 450, 452.1, 452.2, 456.1, 455/456.2; 370/277, 78, 281, 282, 295, 370/329, 336, 342, 479; 375/295, 316
See application file for complete search history.

(56) References Cited

U.S. PATENT DOCUMENTS

| 2005/0123062 | A1 | | 6/2005 | Bassompierre et al. |
|---|---|---|---|---|
| 2007/0280183 | A1 | * | 12/2007 | Cho et al. ............ 370/338 |
| 2008/0160990 | A1 | * | 7/2008 | Karmi ............ 455/424 |
| 2009/0262670 | A1 | * | 10/2009 | Cho et al. ............ 370/280 |
| 2010/0260117 | A1 | * | 10/2010 | Ojala et al. ............ 370/329 |
| 2011/0199945 | A1 | * | 8/2011 | Chang et al. ............ 370/281 |

FOREIGN PATENT DOCUMENTS

| CN | 101179306 A | 5/2008 |
|---|---|---|
| JP | 2009-540730 A | 11/2009 |
| JP | 2010-518786 A | 5/2010 |
| KR | 10-2001-0083620 A | 1/2001 |
| KR | 10-2001-0045097 A | 5/2001 |
| KR | 10-2002-0047595 A | 6/2002 |
| WO | 03/056860 A1 | 7/2003 |
| WO | 2008/156063 A1 | 12/2008 |

OTHER PUBLICATIONS

"Uplink Asynchronous HARQ for Relay Link," 3GPP TSG-RAN WG1 #56, R1-090642, Feb. 9-13, 2009.
"Considerations on TDD Relay," 3GPP TSG RAN WG1 Meeting #55bis, R1-090244, Jan. 12-16, 2009.

* cited by examiner

*Primary Examiner* — Shaima Q Aminzay
(74) *Attorney, Agent, or Firm* — Jefferson IP Law, LLP

(57) ABSTRACT

A method and apparatus for power control in a wireless communication system are provided. A Mobile Station (MS) operation method for power control in a wireless communication system includes assigning an UpLink (UL) control channel to the MS from a Base Station (BS), determining a location to receive a Transmit Power Control (TPC) command based on the UL control channel, and receiving a TPC command in the determined location and increasing or decreasing transmit power, thus advantageously being capable of reducing an overhead for power control command assignment information.

52 Claims, 6 Drawing Sheets

METHOD AND APPARATUS FOR POWER CONTROL IN A WIRELESS COMMUNICATION SYSTEM

PRIORITY

This application claims the benefit under 35 U.S.C. §119(a) of a Korean patent application filed in the Korean Intellectual Property Office on Mar. 6, 2009 and assigned Serial No. 10-2009-0019409, a Korean patent application filed in the Korean Intellectual Property Office on Jan. 8, 2010 and assigned Serial No. 10-2010-0001991 and a Korean patent application filed in the Korean Intellectual Property Office on Mar. 5, 2010 and assigned Serial No. 10-2010-0019733, the entire disclosures of all of which are hereby incorporated by reference.

BACKGROUND OF THE INVENTION

1. Field of the Invention

The present invention relates to power control. More particularly, the present invention relates to a method and apparatus for determining a transmission location of a power control command based on an UpLink (UL) control channel and for performing power control in a broadband wireless communication system.

2. Description of the Related Art

In a next generation communication system, intensive research is being conducted to provide users with high-speed services having various Qualities of Service (QoSs). Power control schemes used in communication systems may be classified as open-loop power control schemes and closed-loop power control schemes according to whether a Base Station (BS) receives feedback information from a Mobile Station (MS).

The open-loop power control schemes are schemes in which a transmitter for performing power control independently determines a channel state of a receiver and performs the power control. The open-loop power control schemes control power based on reversibility between UpLink (UL) and DownLink (DL) channels. Here, the reversibility between the UL and DL channels means that MSs having the same location with respect to a BS experience similar path attenuation due to a path attenuation based on a distance from the BS determining a channel quality, an antenna gain based on an antenna pattern, a shadowing effect by a topographic feature, multi-path fading, and the like. That is, the open-loop power control schemes are schemes in which, based on the reversibility between the DL and UL channels, a transmitter directly estimates a signal reception quality of a receiver, determines necessary transmit power, and transmits signals.

Unlike the open-loop power control schemes, the closed-loop power control schemes are schemes in which a transmitter controls transmit power as much as needed based on a signal reception quality of a receiver received over a feedback channel, without independently determining a channel quality. The closed-loop power control schemes have a disadvantage in which an overhead for the feedback channel occurs. However, there is an advantage in that, because the transmitter may be aware of a channel quality at the receiver, the closed-loop power control schemes may accurately control magnitudes of transmit signals compared to the open-loop power control schemes.

For instance, legacy Orthogonal Frequency Division Multiple Access (OFDMA) broadband wireless communication systems (e.g., the Institute of Electrical and Electronics Engineers (IEEE) standard 802.16 systems) may transmit Transmit Power Control (TPC) commands for all users using Information Element (IE) formats or MS identifiers, but overheads for feedback channels are large.

As described above, the closed-loop power control scheme has a problem because, as the number of MSs provided with communication services from a BS in a broadband wireless communication system increases, an amount of channel quality information that the BS should receive from each MS over a feedback channel increases and, in addition, an overhead of a feedback channel assigned for receiving the channel quality information increases.

Therefore, there exists a need for a method and apparatus of efficient power control command transmission for closed-loop power control at the time of UL power control in a wireless communication system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for reducing an overhead of a DownLink (DL) control channel for a Transmit Power Control (TPC) command according to closed-loop power control in a broadband wireless communication system.

Another aspect of the present invention is to provide a method and apparatus for implicitly determining a transmission location of a power control command based on an UpLink (UL) control channel in a broadband wireless communication system.

A further aspect of the present invention is to provide a method and apparatus of efficient power control command transmission for closed-loop power control in a broadband wireless communication system.

The above aspects are achieved by providing a method and apparatus for power control in a wireless communication system.

In accordance with an aspect of the present invention, a Mobile Station (MS) operation method for power control in a wireless communication system is provided. The method includes assigning a UL control channel to the MS from a Base Station (BS), determining a location to receive a TPC command based on the UL control channel, and receiving a TPC command in the determined location and increasing or decreasing transmit power.

In accordance with another aspect of the present invention, an MS operation method for power control in a wireless communication system is provided.

The method includes assigning a UL control channel to the MS from a BS, transmitting control information through the UL control channel, and, during a predefined duration, receiving a TPC command corresponding to the UL control channel. The predefined duration is determined according to a transmission period of UL control information.

In accordance with a further aspect of the present invention, a BS operation method for power control in a wireless communication system is provided. The method includes assigning a UL control channel to at least one or more MSs, determining a location to transmit a TPC command based on the UL control channel, and transmitting a TPC command in the determined location.

In accordance with yet another aspect of the present invention, a BS operation method for power control in a wireless communication system is provided. The method includes assigning a UL control channel to at least one or more MSs, receiving control information through the UL control channel, measuring a Signal to Interference plus Noise Ratio (SINR) of the UL control channel, and, during a predefined duration, transmitting a TPC command considering the measured SINR. The predefined duration is determined according to a transmission period of UL control information.

In accordance with still another aspect of the present invention, an MS apparatus for power control in a wireless communication system is provided. The apparatus includes a TPC transmission location determiner for determining a location to receive a TPC command based on a UP control channel, and a controller for assigning the UL control channel, for receiving a TPC command in the determined location, and for increasing or decreasing transmit power.

In accordance with an aspect of the present invention, an MS apparatus for power control in a wireless communication system is provided. The apparatus includes a controller for assigning a UL control channel from a BS, and for transmitting control information through the UL control channel, a TPC transmission location determiner for receiving a TPC command corresponding to the UL control channel during a predefined duration, wherein the predefined duration is determined according to a transmission period of UL control information.

In accordance with another aspect of the present invention, a BS apparatus for power control in a wireless communication system is provided. The apparatus includes a controller for assigning a UL control channel to at least one or more MSs, a TPC transmission location determiner for determining a location to transmit a TPC command based on the UL control channel, wherein the controller transmits a TPC command in the determined location.

In accordance with still another aspect of the present invention, a BS apparatus for power control in a wireless communication system is provided. The apparatus includes a controller for assigning a UL control channel to at least one or more MSs, and for receiving control information through the UL control channel, a SINR measurer for measuring an SINR of the UL control channel, a TPC transmission location determiner for transmitting a TPC command considering the measured SINR during a predefined duration, wherein the predefined duration is determined according to a transmission period of UL control information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method and apparatus for reducing an overhead for a Transmit Power Control (TPC) command according to closed-loop power control in a broadband wireless communication system according to an exemplary embodiment of the present invention are described below.

A method and apparatus for transmitting a TPC command are provided using minimum resources in an Orthogonal Frequency Division Multiple Access (OFDMA) system in which one frame includes a plurality of subframes. The TPC command is used in a closed-loop power control environment. For a periodic TPC command assignment, a reference signal of a periodic UpLink (UL) channel is needed because a TPC command value is determined depending on a change of a UL channel.

Below, a UL channel is estimated using a Channel Quality Indicator (CQI) channel for feeding back DownLink (DL) channel information among UL control channels, a TPC command value is generated accordingly, and a TPC command is transmitted in an implicit frame location.

A CQI channel is, for example, described below. However, other UL control channels, such as a ranging channel, an ACKnowledgement (ACK) channel, and the like, may be used as a reference signal of a UL channel.

Figure 1:
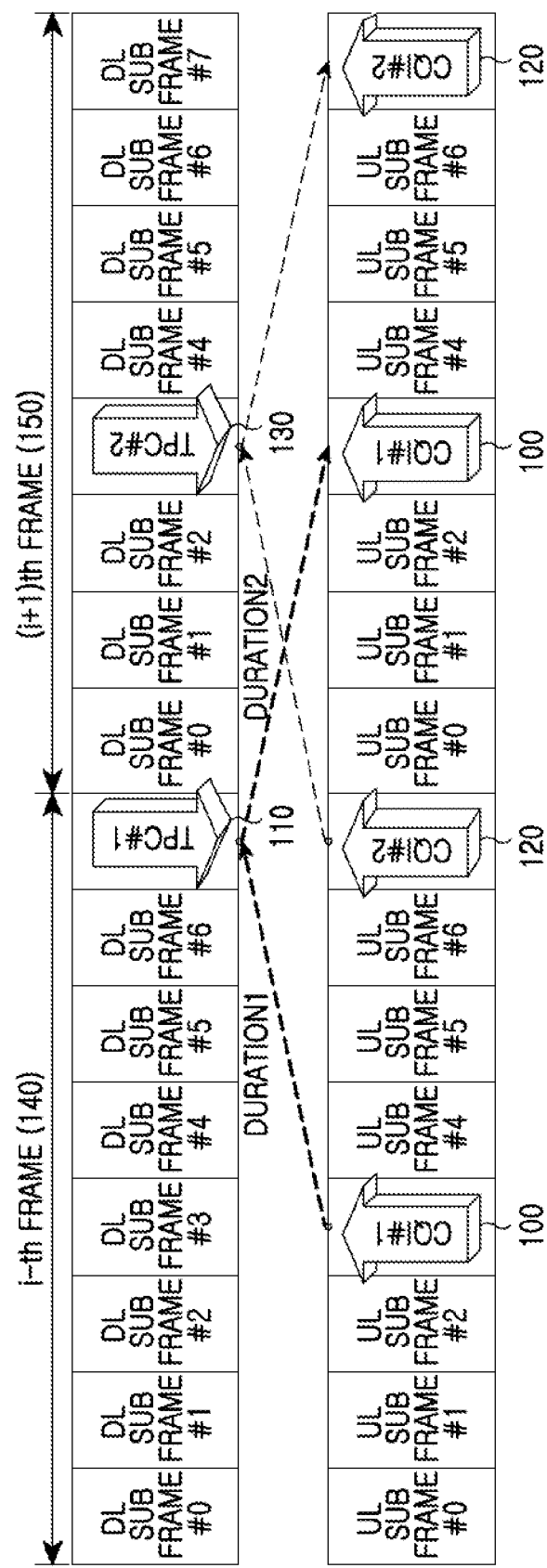
FIG. 1 is a diagram illustrating an example of reducing an overhead for a Transmit Power Control (TPC) command in a Frequency Division Duplex (FDD)-based broadband wireless communication system according to an exemplary embodiment of the present invention.

FIG. 1 is a diagram illustrating an example of reducing an overhead for a TPC command in a Frequency Division Duplex (FDD)-based broadband wireless communication system according to an exemplary embodiment of the present invention.

Referring to FIG. 1, an assumption is made herein that one frame includes eight subframes in a frame structure of an FDD system, and a CQI report period (P) is eight subframes.

In a case where a CQI#1 100 of a first Mobile Station (MS) is transmitted to a BS through a UL subframe#3 within an $i^{th}$ frame 140, a Base Station (BS) measures a Signal to Interference plus Noise Ratio (SINR) of a corresponding CQI channel, determines a TPC command value accordingly, and transmits a TPC command (TPC#1) 110 to the first MS in a location defined with the first MS. The location of the TPC command (TPC#1) is a DL subframe#7 of the $i^{th}$ frame 140, and may be determined from CQI channel assignment information in the first MS and the BS, respectively. Accordingly, the BS does not need to transmit an overhead for the TPC command (TPC#1) through a separate DL channel.

Similarly, in a case where a CQI#2 120 of a second MS is transmitted to the BS through a UL subframe#7 within the $i^{th}$ frame 140, the BS measures an SINR of a corresponding CQI channel, determines a TPC command value accordingly, and transmits a TPC command (TPC#2) 130 to the second MS in a location defined with the second MS. The location of the TPC command (TPC#2) is a DL subframe#3 of an $(i+1)^{th}$ frame 150, and may be determined from CQI channel assignment information in the second MS and the BS, respectively.

In an exemplary implementation, a location of a TPC command within each subframe is matched with a CQI channel. If a CQI#1 100 uses a $q^{th}$ CQI channel of a UL subframe#3, a location of a TPC command for an MS may use a $q^{th}$ TPC command channel of a DL subframe#3.

The following is a rule in which the BS and the MS each determine a TPC command channel.

In a case where a frame index (i), a subframe index (m), and a channel index (q) are given and a first duration (Duration 1) between CQI transmission and TPC command transmission is not greater than a second duration (Duration 2) between the TPC command transmission and a next CQI transmission (i.e., first duration≤second duration) (that is, in a case where the above condition is designed), a frame (TPC$_{frame}$) of a TPC command channel is determined in Equation 1 below, and a subframe (TPC$_{subframe}$) is determined in Equation 2 below.

$$TPC_{frame}=i+floor[(m+P/2)/N] \quad (1)$$

$$TPC_{subframe}=(floor(m+P/2)) \bmod N \quad (2)$$

In Equations 1 and 2, 'P' is a CQI report period and is counted in a unit of subframes, and 'N' is the total number of subframes constituting one frame. The 'floor(x)' is a function for outputting the largest integer less than an 'x' value.

In a case where a frame index (i), a subframe index (m), and a channel index (q) are given and a first duration (Duration 1) between CQI transmission and TPC command transmission is not greater than a second duration (Duration 2) between the TPC command transmission and a next CQI transmission (i.e., first duration≤second duration) (that is, in a case where the above condition is designed), a frame (TPC$_{frame}$) of a TPC command channel is determined in Equation 3 below, and a subframe (TPC$_{subframe}$) is determined in Equation 4 below.

$$TPC_{frame}=i+floor[(m+N/2)/N] \quad (3)$$

$$TPC_{subframe}=(floor(m+N/2)) \bmod N \quad (4)$$

In Equations 3 and 4, 'N' is the total number of subframes constituting one frame. The 'floor(x)' is a function for outputting the largest integer less than an 'x' value.

That is, a relationship of first duration≤second duration is given depending on the number (N) of subframes or the CQI transmission period (P).

In a case where a frame index (i), a subframe index (m), and a channel index (q) are given and a first duration (Duration 1) between CQI transmission and TPC command transmission is equal to or is greater than a second duration (Duration 2) between the TPC command transmission and a next CQI transmission (i.e., first duration≥second duration) (that is, in a case where the above condition is designed), a frame (TPC$_{frame}$) of a TPC command channel is determined in Equation 5 below, and a subframe (TPC$_{subframe}$) is determined in Equation 6 below.

$$TPC_{frame}=i+floor[ceil(m+P/2)/N] \quad (5)$$

$$TPC_{subframe}=ceil(m+P/2) \bmod N \quad (6)$$

In Equations 3 and 4, 'P' is a CQI report period and is counted in a unit of subframes, and 'N' is the total number of subframes constituting one frame. The 'floor(x)' is a function outputting the largest integer less than an 'x' value, and the 'ceil(y)' is a function for rounding off below a decimal point of real number (y).

That is, a relationship of first duration≥second duration is given depending on the number (N) of subframes or the CQI transmission period (P).

In a case where a frame index (i), a subframe index (m), and a channel index (q) are given and a first duration (Duration 1) between CQI transmission and TPC command transmission is equal to or is greater than a second duration (Duration 2) between the TPC command transmission and a next CQI transmission (i.e., first duration≥second duration) (that is, in a case where the above condition is designed), a frame (TPC$_{frame}$) of a TPC command channel is determined in Equation 7 below, and a subframe (TPC$_{subframe}$) is determined in Equation 8 below.

$$TPC_{frame}=i+floor[ceil(m+N/2)/N] \quad (7)$$

$$TPC_{subframe}=ceil(m+N/2) \bmod N \quad (8)$$

In Equations 3b and 4b, 'N' is the total number of subframes constituting one frame. The 'floor(x)' is a function outputting the largest integer less than an 'x' value, and the 'ceil(y)' is a function for rounding off below a decimal point of real number (y).

In a case where a frame index (i), a subframe index (m), and a channel index (q) are given and a duration (R) between a CQI transmission subframe and a next TPC command transmission subframe is determined in a unit of subframes, a frame (TPC$_{frame}$) of a TPC command channel is determined in Equation 5 below, and a subframe (TPC$_{subframe}$) is determined in Equation 6 below. For example, when the CQI#1 100 is transmitted at the UL subframe#3 and the duration (R) is equal to '4' as in FIG. 1, a next TPC command is transmitted at the DL subframe#7 (110). Here, 'R' may be set as a system operation parameter that a BS broadcasts to an MS.

$$TPC_{frame}=i \text{ if } (m+R)<N \text{ } i+1 \text{ if } (m+R)\geq N \quad (5)$$

$$TPC_{subframe}=(m+R) \bmod N \quad (6)$$

The BS should define a duration (R) value as a system operation parameter and inform the MS of the duration (R) value in a way to, after transmitting a CQI, transmit a TPC command at a subframe after a preset duration (R). Accordingly, a signaling overhead may increase compared to Equations 1 to 4, and may be flexible.

Figure 2:
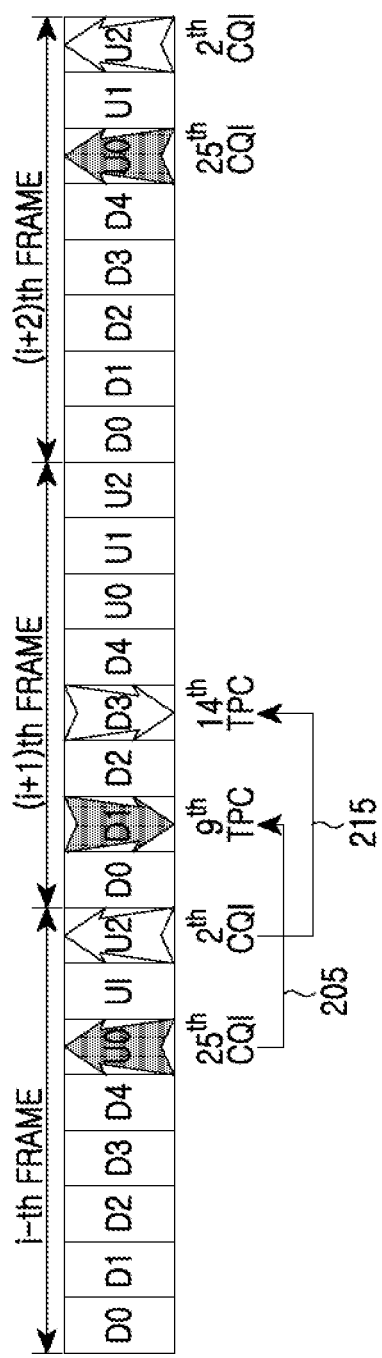
FIG. 2 is a diagram illustrating an example of reducing an overhead for a TPC command in a Time Division Duplex (TDD)-based broadband wireless communication system according to an exemplary embodiment of the present invention.

FIG. 2 is a diagram illustrating an example of reducing an overhead for a TPC command in a Time Division Duplex (TDD)-based broadband wireless communication system according to an exemplary embodiment of the present invention.

Referring to FIG. 2, an assumption is made herein that one frame includes eight subframes in a frame structure of a TDD system.

The following parameters are frame structure and CQI channel related parameters, which are used to describe an exemplary embodiment of the present invention.

N: total number of subframes in a frame (N=D+U)
D: total number of DL subframes in a frame
U: total number of UL subframes in a frame
Q: total number of CQI channels in a UL subframe
q: index for an assigned location of CQI channel for MS
T: total number of TPC channels in a DL subframe
m: UL subframe index (0≤m≤U−1)

In the frame structure of the TDD system, an assumption is made as follows:

Total number (Q) of CQI channels per frame is equal to total number (T) of TPC command channels per frame;

$$U*Q=D*T;$$

Number of CQI channels per subframe is constant in all subframes within a frame; and
Number of TPC command channels per subframe is constant in all subframes within a frame.
If U*Q is not identical to D*T, D*T is larger than U*Q.

Based on the above assumption, a location of a TPC channel may be determined as follows:

1) T=ceil(U*Q/D)
2) In a case where a CQI location of an MS is a $q^{th}$ channel of an $m^{th}$ subframe, a CQI index (s) among the whole CQI channels within a frame is given as "s=Q*m+q" (0≤s≤U*Q−1).
3) TPC location frame: floor [s/T]
4) channel within subframe of TPC: s mod T

TABLE 1

| | frame index | subframe index | channel index | note |
|---|---|---|---|---|
| CQI channel | i | m | q | |
| TPC channel (option 1) | i + 1 | floor[s/T] | s mod T | Located in frame next to CQI transmission frame |
| TPC channel (option 2) | i + ceil[P/N/2] | floor[s/T] | s mod T | Located in frame before half of CQI period (P) |
| TPC channel (option 3) | i + floor[P/N/2] + 1 | floor[s/T] | s mod T | Located in frame after half of CQI period (P) |
| TPC channel (option 4) | i + R | floor[s/T] | s mod T | Located in $R^{th}$ next frame after CQI transmission frame |

In Table 1, Option 1 is a case where a TPC is located in an (s mod T)$^{th}$ TPC channel within a (floor[s/T])$^{th}$ subframe of an (i+1)$^{th}$ frame next to an $i^{th}$ frame having transmitted a CQI.

Option 2 is a case where a TPC is located in an (s mod T)$^{th}$ TPC channel within a (floor[s/T])$^{th}$ subframe of a frame before a half of a value dividing a CQI period (P) (having a unit of subframes) by the number of subframes per frame.

Option 3 is a case where a TPC is located in an (s mod T)$^{th}$ TPC channel within a (floor[s/T])$^{th}$ subframe of a frame after half a value dividing a CQI period (P) (having a unit of subframe) by the number of subframes per frame.

Option 4 is a case where a TPC is located in an (s mod T)$^{th}$ TPC channel within a (floor[s/T])$^{th}$ subframe of an (i+R)$^{th}$ frame next to an $R^{th}$ frame of an $i^{th}$ frame having transmitted a CQI. Here, after a CQI is transmitted, a TPC command is transmitted at a subframe after a preset duration (R), wherein the duration (R) may be operated as a system parameter.

For example, in FIG. 2, the number (T) of TPC command channels per DL subframe is given as "30*3/5=18" when assuming that the total number (N) of subframes per frame is equal to '8', the total number (D) of DL subframes per frame is equal to '5', the total number (U) of UL subframes per frame is equal to '3', and the total number (Q) of CQI channels per subframe is equal to '30'.

Option 4 of 'R=1', Option 1, and Option 2, where the CQI report period (P) is equal to '16', all have the same result as in FIG. 2. In this case, as indicated by reference numeral 205, when an MS is assigned a $25^{th}$ CQI of a $0^{th}$ UL subframe (U0), a CQI index (s) of the MS is equal to '25'. Thus, a subframe (TPC$_{subframe}$) of a TPC channel is equal to '1' (D1) and a location of the TPC channel is equal to '25 mod 16=9' ($9^{th}$ TPC). Also, as indicated by reference numeral 215, when the MS uses a $2^{nd}$ CQI of a $2^{nd}$ UL subframe (U2), a CQI index (s) of the MS is equal to '62'. Thus, a subframe (TPC$_{subframe}$) of a TPC channel is equal to '3' (D3) and a location of the TPC channel is equal to '62 mod 16=14' ($14^{th}$ TPC).

Figure 3:
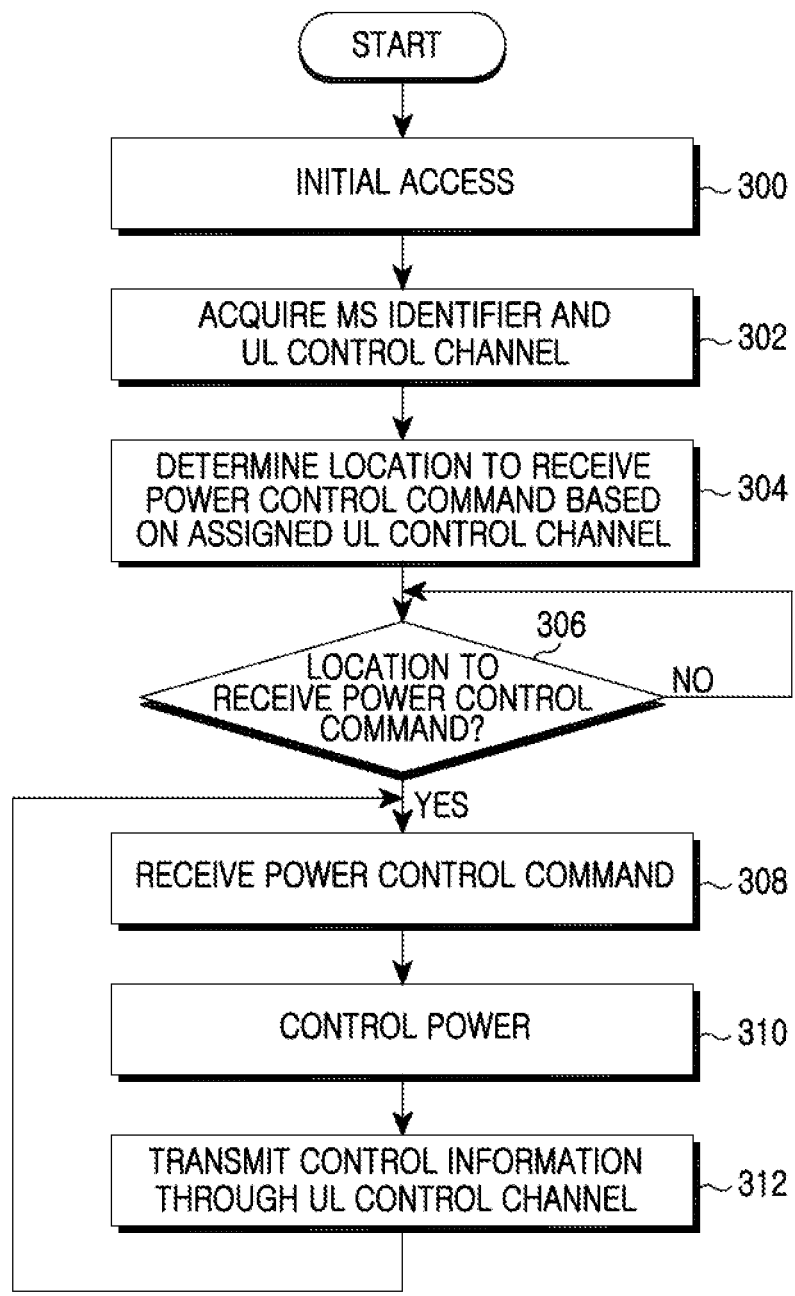
FIG. 3 is a flow diagram illustrating a Mobile Station (MS) operation for reducing an overhead for a TPC command according to closed-loop power control in a broadband wireless communication system according to an exemplary embodiment of the present invention.

FIG. 3 is a flow diagram illustrating an MS operation for reducing an overhead for a TPC command according to closed-loop power control in a broadband wireless communication system according to an exemplary embodiment of the present invention.

Referring to FIG. 3, in step 300, an MS attempts an initial access for a corresponding BS. In step 302, if the initial access succeeds, the MS may acquire an MS identifier and a UL control channel from the corresponding BS. For example, the UL control channel is a ranging channel, a CQI channel, an ACK channel, and the like. The ranging, CQI, ACK information, and the like are control information that the MS periodically feeds back to the corresponding BS.

In step 304, the MS determines a TPC command location based on the assigned UL control channel. In other words, the MS determines a subframe of a frame to receive a TPC command from the corresponding BS, considering a transmission period, and the like, of the control information (e.g., a CQI) that the MS shall feed back through the UL control channel. A rule for determining a frame to transmit a TPC command and a subframe index of the frame refers to FIGS. 1 and 2.

Accordingly, although not receiving separate DL control information, the MS may receive the TPC command from the corresponding BS.

In step 306, the MS determines if it is in a location to receive a TPC command transmitted from the corresponding BS, i.e., determines a frame including the TPC command and a subframe index. The MS then proceeds to step 308. In step 308, when the TPC command is included within a subframe of a corresponding frame, the MS receives the TPC command. The TPC command value, which is a preset bit value, increases or decreases power of the MS.

In step 310, the MS controls transmit power according to the received TPC command. That is, the MS increases or decreases transmit power according to the TPC command value.

In step 312, the MS transmits the control information (e.g., the ranging, CQI, ACK information, and the like) to the corresponding BS through the UL control channel assigned in step 302. Here, step 312 is performed separately from processors of steps 308 to 310, and may be performed anytime after step 302. Also, steps 308 to 310 are periodically performed until the end of the feedback of the control information through the UL control channel.

Figure 4:
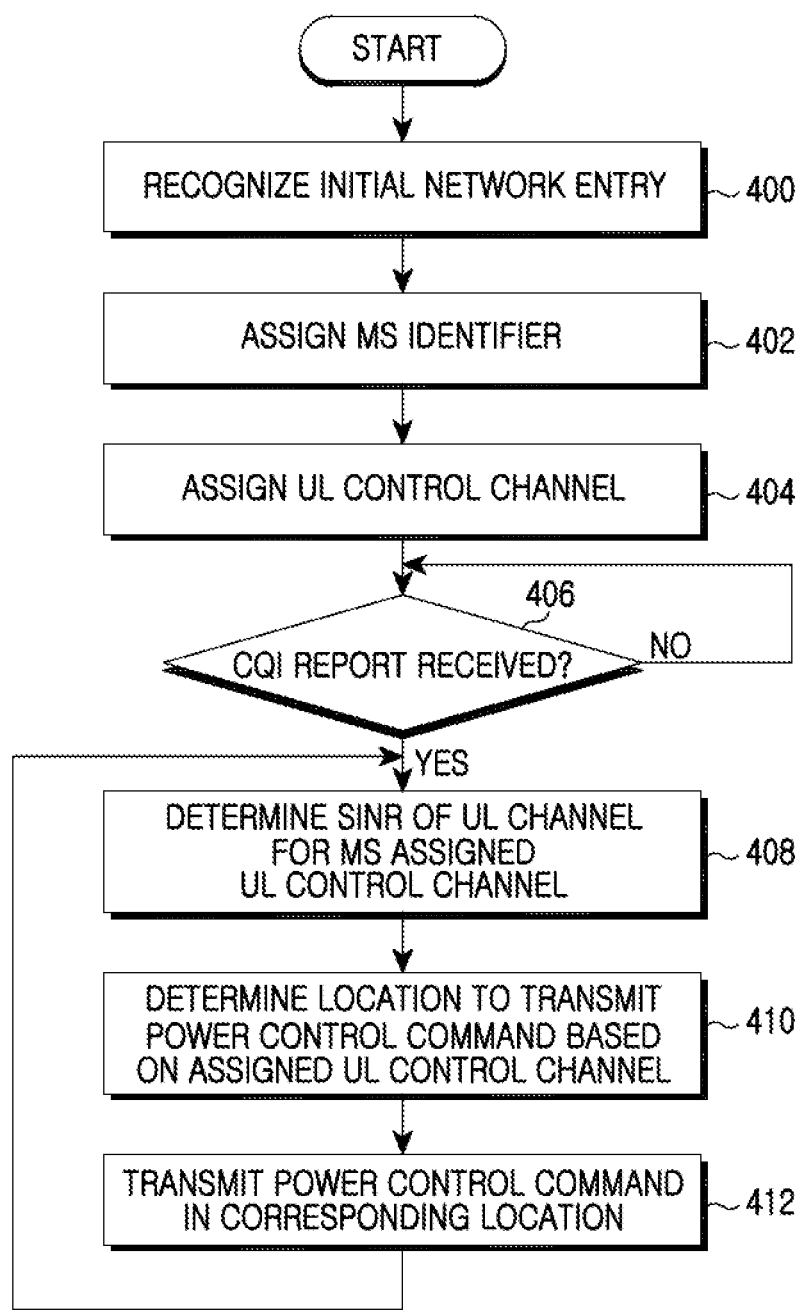
FIG. 4 is a flow diagram illustrating a Base Station (BS) operation for reducing an overhead for a TPC command according to closed-loop power control in a broadband wireless communication system according to an exemplary embodiment of the present invention.

FIG. 4 is a flow diagram illustrating a BS operation for reducing an overhead for a TPC command according to closed-loop power control in a broadband wireless communication system according to an exemplary embodiment of the present invention.

Referring to FIG. 4, in step 400, a BS recognizes an initial network entry of a corresponding MS. In step 402, the BS assigns an MS identifier to the corresponding MS. In step 404, the BS assigns a UL control channel to the corresponding MS. For example, the UL control channel is a ranging channel, a CQI channel, an ACK channel, and the like. The ranging, CQI, ACK information, and the like, are control information periodically fed back to the BS from the MS.

The BS determines whether corresponding UL control information is received in step 406. If it is determined that the corresponding UL control information (e.g., a CQI) from the corresponding MS through the assigned UL control channel is received in step 406, the BS proceeds to step 408 and determines an SINR of a UL channel for the MS assigned to the UL control channel. That is, because the CQI value is previously known, the BS may determine an SINR using a correlation with the received CQI value.

In step 410, the BS determines a TPC command location based on the assigned UL control channel. In other words, the BS determines a subframe of a frame to transmit a TPC command in consideration of a transmission period, and the like, of control information (e.g., a CQI) fed back through a UL control channel. A rule for determining a frame to transmit a TPC command and a subframe index of the frame refers to FIGS. 1 and 2.

In step 412, the BS transmits a TPC command in the determined subframe location of the frame.

On the other hand, in a case where the BS periodically receives UL control information from the corresponding MS, the BS repeatedly performs steps 408 to 412.

Figure 5:
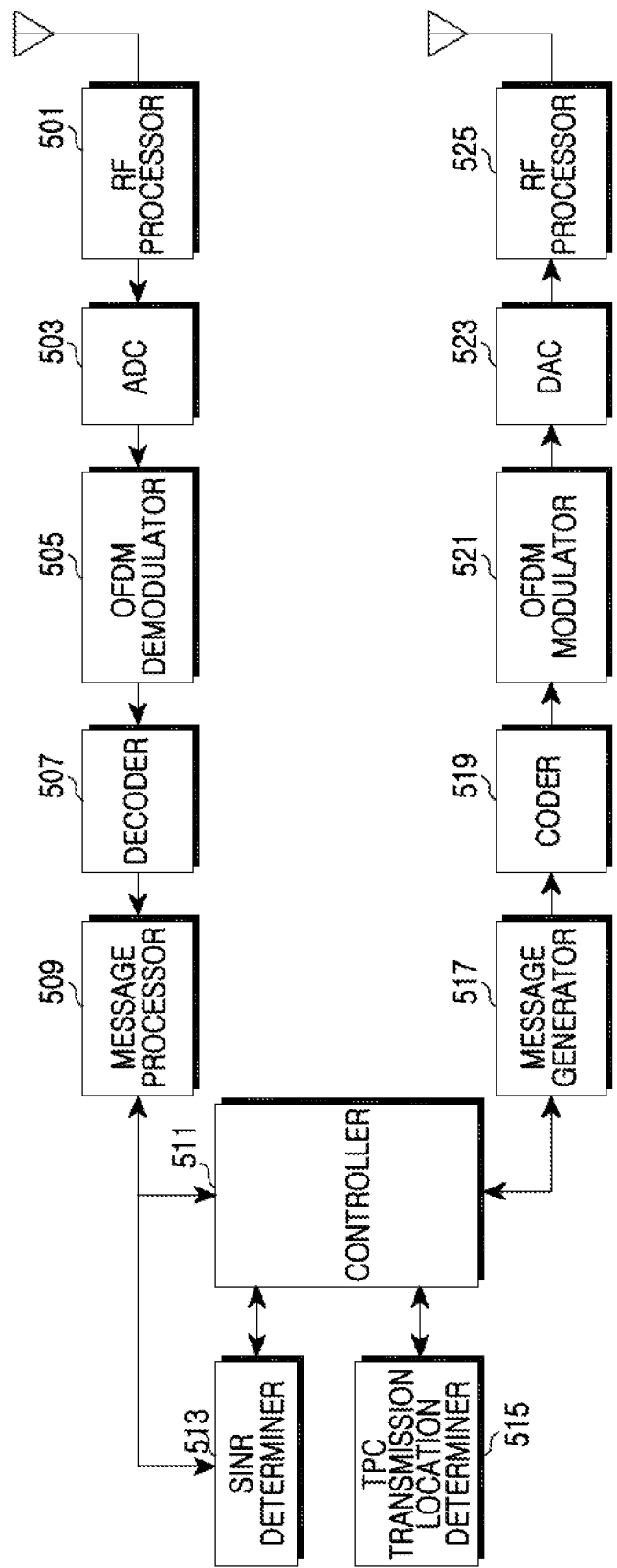
FIG. 5 is a block diagram illustrating a construction of a BS for reducing an overhead for a TPC command according to closed-loop power control in a broadband wireless communication system according to an exemplary embodiment of the present invention.

FIG. 5 is a block diagram illustrating a construction of a BS for reducing an overhead for a TPC command according to closed-loop power control in a broadband wireless communication system according to an exemplary embodiment of the present invention.

Referring to FIG. 5, the BS includes a Radio Frequency (RF) processor 501, an Analog to Digital Converter (ADC) 503, an Orthogonal Frequency Division Multiplexing (OFDM) demodulator 505, a decoder 507, a message processor 509, a controller 511, an SINR determiner 513, a TPC transmission location determiner 515, a message generator 517, a coder 519, an OFDM modulator 521, a Digital to Analog Converter (DAC) 523, and an RF processor 525.

A receive end includes the RF processor 501, the ADC 503, the OFDM demodulator 505, the decoder 507, and the message processor 509, and a transmit end includes the message generator 517, the coder 519, the OFDM modulator 521, the DAC 523, and the RF processor 525. The receive end and transmit end may operate in FDD or TDD.

During a reception duration, the RF processor 501 converts an RF signal received through an antenna into a baseband analog signal. The ADC 503 converts the analog signal from the RF processor 501 into sample data. The OFDM demodulator 505 processes, by Fast Fourier Transform (FFT), the sample data output from the ADC 503 and outputs frequency domain data.

The decoder 507 selects data of subcarriers intended for actual reception among the frequency domain data from the OFDM demodulator 505, and demodulates and decodes the selected data according to a predefined modulation level (i.e., a Modulation and Coding Scheme (MCS) level).

The message processor 509 analyzes a control message input from the decoder 507 and provides the result to the controller 511. In an exemplary implementation, the message processor 509 provides UL control information (i.e., ranging, CQI, ACK information, and the like) received from an MS, to the controller 511.

The controller 511 controls a general function of the BS, performs a corresponding process for information provided from the message processor 509, and provides the result to the message generator 517. Also, the controller 511 determines a TPC command value of a corresponding MS considering an SINR of a UL control channel of the corresponding MS determined in the SINR determiner 513.

The SINR determiner 513 determines an SINR of a UL control channel of a corresponding MS. For example, if CQI information from the message processor 509 is received, the SINR determiner 513 may determine an SINR using a correlation with the received CQI value because the CQI value is previously known.

The TPC transmission location determiner 515 determines a TPC command location based on an assigned UL control channel. In other words, the TPC transmission location determiner 515 determines a subframe of a frame to transmit a TPC command considering a transmission period, and the like, of control information (e.g., a CQI) to be fed back through a UL control channel. A rule for determining a frame to transmit a TPC command and a subframe index of the frame refers to FIGS. 1 and 2.

The message generator 517 generates a message with various kinds of information provided from the controller 511 and outputs the message to the coder 519 of a physical layer. More particularly, the message generator 517 transmits a TPC command value provided from the controller 511 to a corresponding MS in a TPC transmission location.

The coder 519 codes and modulates data from the message generator 517 according to a predefined modulation level (i.e., an MCS level). The OFDM modulator 521 IFFT-processes the data from the coder 519 and outputs sample data (i.e., an OFDM symbol). The DAC 523 converts the sample data into an analog signal. The RF processor 525 converts the analog signal from the DAC 523 into an RF signal and transmits the RF signal through an antenna.

Figure 6:
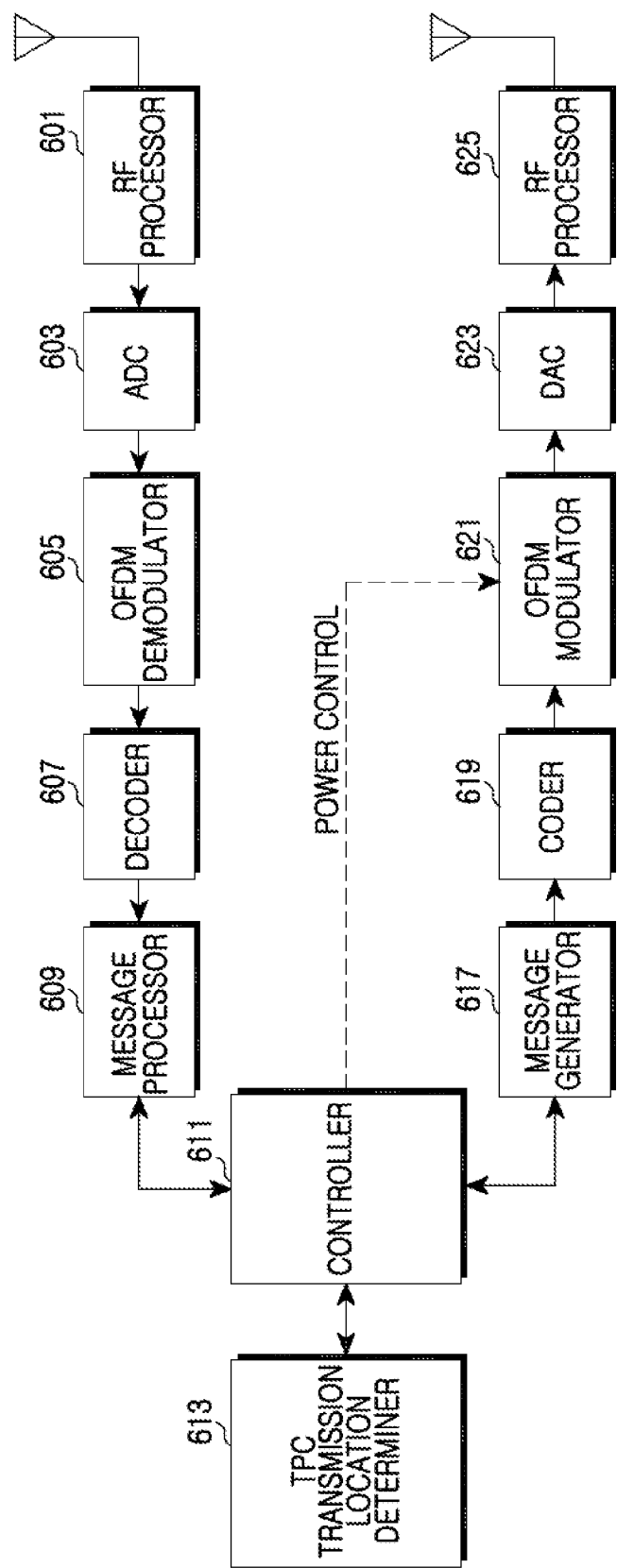
FIG. 6 is a block diagram illustrating a construction of an MS for reducing an overhead for a TPC command according to closed-loop power control in a broadband wireless communication system according to an exemplary embodiment of the present invention.

FIG. 6 is a block diagram illustrating a construction of an MS for reducing an overhead for a TPC command according to closed-loop power control in a broadband wireless communication system according to an exemplary embodiment of the present invention.

Referring to FIG. 6, the MS includes an RF processor 601, an ADC 603, an OFDM demodulator 605, a decoder 607, a message processor 609, a controller 611, a TPC transmission location determiner 613, a message generator 617, a coder 619, an OFDM modulator 621, a DAC 623, and an RF processor 625.

A receive end includes the RF processor 601, the ADC 603, the OFDM demodulator 605, the decoder 607, and the message processor 609. A transmit end includes the message generator 617, the coder 619, the OFDM modulator 621, the DAC 623, and the RF processor 625. The receive end and transmit end operate in FDD or TDD.

During a reception duration, the RF processor 601 converts an RF signal received through an antenna into a baseband analog signal. The ADC 603 converts the analog signal provided from the RF processor 601 into sample data. The OFDM demodulator 605 FFT-processes the sample data output from the ADC 603, and outputs frequency domain data.

The decoder 607 selects data of subcarriers intended for actual reception among the frequency domain data provided from the OFDM demodulator 605, and demodulates and decodes the selected data according to a predefined modulation level (i.e., an MCS level).

The message processor 609 analyzes a control message input from the decoder 607 and provides the result to the controller 611. For example, the message processor 609 provides the controller 611 with a TPC command value received from a BS in a TPC command location determined by the TPC transmission location determiner 613.

The TPC transmission location determiner 613 determines a TPC command location based on an assigned UL control channel. In other words, the TPC transmission location determiner 613 determines a subframe of a frame to transmit a TPC command considering a transmission period, and the like, of control information (e.g., a CQI) to be fed back through a UL control channel. A rule for determining a frame to transmit a TPC command and a subframe index of the frame refers to FIGS. 1 and 2.

The controller 611 controls a general function of the MS, performs a corresponding process for information provided from the message processor 609, and provides the result to the message generator 617. Also, the controller 611 increases or decreases transmit power according to a TPC command and performs power control.

The message generator 617 generates a message with various kinds of information provided through the controller 611 and outputs the message to the coder 619 of a physical layer. For example, the message generator 617 is provided with UL control information, i.e., ranging, CQI, ACK information, etc. from the controller 611.

The coder 619 codes and modulates data from the message generator 617 according to a predefined modulation level (i.e., an MCS level). The OFDM modulator 621 IFFT-processes the data from the coder 619 and outputs sample data (i.e., an OFDM symbol). The DAC 623 converts the sample data into an analog signal. The RF processor 625 converts the analog signal from the DAC 623 into an RF signal and transmits the RF signal through an antenna.

In FIGS. 5 and 6, the controllers 511 and 611 control the message processors 509 and 609, the message generators 517 and 617, the SINR determiner 513, and the TPC transmission location determiners 515 and 613, respectively. That is, the controllers 511 and 611 may perform functions of the message processors 509 and 609, the message generators 517 and 617, the SINR determiner 513, and the TPC transmission location determiners 515 and 613, respectively. Constructions of a BS and an MS are separately constructed and shown in order to distinguish and describe respective functions according to an exemplary embodiment of the present invention. Thus, the constructions may be processed in the controllers 511 and 611 and a portion of the constructions may be processed in the controllers 511 and 611.

Exemplary embodiments of the present invention have an advantage of being capable of reducing an overhead for power control command assignment information by determining a transmission location of a power control command based on a UL control channel in a broadband wireless communication system. Also, exemplary embodiments of the present invention may increase system efficiency by minimizing a DL signaling overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Mobile Station (MS) operation method for power control in a wireless communication system, the method comprising:

assigning an UpLink (UL) control channel to the MS from a Base Station (BS);

determining, by the MS, a frame index and a subframe index of a subframe that includes a Transmit Power Control (TPC) command using at least one of a frame index, a subframe index and a transmission period of the UL control channel;

receiving a TPC command in the determined frame index and subframe index of the subframe that includes the TPC command; and performing at least one of increasing and decreasing transmit power.

2. The method of claim 1, wherein the UL control channel comprises a Channel Quality Indicator (CQI) channel.

3. The method of claim 1, wherein the determined frame index and subframe index of the subframe that includes the TPC command are determined by the following equation:

$$TPC_{frame}=i+\text{floor}[(m+P/2)/N]$$

$$TPC_{subframe}=(\text{floor}(m+P/2))\bmod N$$

wherein

'i' is a frame index,

'm' is a subframe index,

'P' is a CQI report period and is counted in a unit of subframes,

'N' is a total number of subframes constituting one frame, and

'floor(x)' is a function for outputting the largest integer less than 'x' value, and wherein a first duration between a CQI transmission and a TPC command transmission is not greater than a second duration between the TPC command transmission and a next CQI transmission (first duration≤second duration), and TPC command index is same to the corresponding CQI channel index.

4. The method of claim 1, wherein the determined frame index and subframe index of the subframe that includes the TPC command are determined by the following equation:

$$TPC_{frame}=i+\text{floor}[\text{ceil}(m+P/2)/N]$$

$$TPC_{subframe}=\text{ceil}(m+P/2))\bmod N$$

wherein

'i' is a frame index,

'm' is a subframe index,

'P' is a CQI report period and is counted in a unit of subframes,

'N' is a total number of subframes constituting one frame,

'floor(x)' is a function for outputting the largest integer less than 'x' value, and 'ceil(y)' is a function for rounding off below a decimal point of real number (y), and wherein a first duration between a CQI transmission and a TPC command transmission is at least one of equal to and greater than a second duration between the TPC command transmission and a next CQI transmission (first duration≥second duration), and TPC command index is same to the corresponding CQI channel index.

5. The method of claim 1, wherein the determined frame index and subframe index of the subframe that includes the TPC command are determined by the following equation:

$$TPC_{frame} = i + floor[ceil(m+N/2)/N]$$

$$TPC_{subframe} = ceil(m+N/2)) \mod N$$

wherein
'i' is a frame index,
'm' is a subframe index,
'N' is a total number of subframes constituting one frame,
'floor(x)' is a function for outputting the largest integer less than 'x' value, and
'ceil(y)' is a function for rounding off below a decimal point of real number (y), and wherein
a first duration between a CQI transmission and a TPC command transmission is at least one of equal to and greater than a second duration between the TPC command transmission and a next CQI transmission (first duration≥second duration), and TPC command index is same to the corresponding CQI channel index.

6. The method of claim 1, wherein the determined frame index and subframe index of the subframe that includes the TPC command are determined by the following equation:

$$TPC_{frame} = i \text{ if } (m+R) < N \text{ } i+1 \text{ if } (m+R) \geq N$$

$$TPC_{subframe} = (m+R) \mod N$$

wherein
'i' is a frame index,
'm' is a subframe index,
'N' is a total number of subframes constituting one frame, and
'R' is a duration between a CQI transmission and a TPC command transmission, and TPC command index is same to the corresponding CQI channel index.

7. The method of claim 1, wherein the determined frame index and subframe index of the subframe that includes the TPC command are determined by the following equation:

$$TPC_{frame} = i + ceil[P/N/2]$$

$$TPC_{subframe} = floor[s/T]$$

wherein
'i' is a frame index,
's' is Q*m+q,
'T' is a total number of TPC channels in a DL subframe,
'Q' is a total number of CQI channels in a UL subframe,
'm' is a subframe index,
'q' is an index for an assigned location of a CQI channel for MS,
'P' is a CQI report period and is counted in a unit of subframes,
'N' is a total number of subframes constituting one frame,
'floor(x)' is a function for outputting the largest integer less than 'x' value, and
'ceil(y)' is a function for rounding off below a decimal point of real number (y), and wherein
'T' is determined by ceil(Q*U/D), 'U' is a total number of UL subframes, and 'D' is a total number of DL subframes, and TPC command index is determined by s mod T.

8. The method of claim 1, wherein the determined frame index and subframe index of the subframe that includes the TPC command are determined by the following equation:

$$TPC_{frame} = i + floor[P/N/2] + 1$$

$$TPC_{subframe} = floor[s/T]$$

wherein
'i' is a frame index,
's' is Q*m+q,
'T' is a total number of TPC channels in a DL subframe,
'Q' is a total number of CQI channels in a UL subframe,
'm' is a subframe index,
'q' is an index for an assigned location of a CQI channel for MS,
'P' is a CQI report period and is counted in a unit of subframes,
'N' is a total number of subframes constituting one frame, and
'floor(x)' is a function for outputting the largest integer less than 'x' value, and wherein
'T' is determined by ceil(Q*U/D), 'U' is a total number of UL subframes, and 'D' is a total number of DL subframes, and TPC command index is determined by s mod T.

9. The method of claim 1, wherein the determined frame index and subframe index of the subframe that includes the TPC command channel are determined by the following equation:

$$TPC_{frame} = i + R$$

$$TPC_{subframe} = floor[s/T]$$

wherein
'i' is a frame index,
'R' is a duration between a CQI transmission and a TPC command transmission,
's' is Q*m+q,
'T' is a total number of TPC channels in a DL subframe,
'Q' is a total number of CQI channels in a UL subframe,
'm' is a subframe index,
'q' is an index for an assigned location of a CQI channel for MS, and
'floor(x)' is a function for outputting the largest integer less than 'x' value, wherein
'T' is determined by ceil(Q*U/D), 'U' is a total number of UL subframes, and 'D' is a total number of DL subframes, and TPC command index is determined by s mod T.

10. A Mobile Station (MS) operation method for power control in a wireless communication system, the method comprising:

receiving an UpLink (UL) control channel allocation from a Base Station (BS);

determining, by the MS, a frame index and a subframe index of a subframe that includes a Transmit Power Control (TPC) command using at least one of a frame index and a subframe index of the allocated UL control channel; and receiving a TPC command in the determined frame index and subframe index of the subframe that includes the TPC command, and at least one of increasing and decreasing transmit power, wherein the determined frame index and subframe index of the subframe that includes the TPC command are determined by the following equation:

$$TPC_{frame} = i + \text{floor}[(m+N/2)/N]$$

$$TPC_{subframe} = (\text{floor}(m+N/2)) \mod N$$

wherein

'i' is a frame index,

'm' is a subframe index,

'N' is a total number of subframes constituting one frame, and

'floor(x)' is a function for outputting the largest integer less than 'x' value.

11. A Mobile Station (MS) operation method for power control in a wireless communication system, the method comprising:

receiving an UpLink (UL) control channel allocation from a Base Station (BS);

determining, by the MS, a frame index and a subframe index of a subframe that includes a Transmit Power Control (TPC) command using at least one of a frame index and a subframe index of the allocated UL control channel; and receiving a TPC command in the determined frame index and subframe index of the subframe that includes the TPC command, and at least one of increasing and decreasing transmit power, wherein the determined frame index and subframe index of the subframe that includes the TPC command are determined by the following equation:

$$TPC_{frame} = i + 1$$

$$TPC_{subframe} = \text{floor}[s/T]$$

wherein

'i' is a frame index,

's' is Q*m+q,

'T' is a total number of TPC channels in a DL subframe,

'Q' is a total number of CQI channels in a UL subframe,

'm' is a subframe index,

'q' is an index for an assigned location of a CQI channel for MS, and

'floor(x)' is a function for outputting the largest integer less than 'x' value.

12. A Mobile Station (MS) operation method for power control in a wireless communication system, the method comprising:

assigning an UpLink (UL) control channel to the MS from a Base Station (BS);

transmitting control information through the UL control channel; and during a predefined duration, receiving a Transmit Power Control (TPC) command corresponding to the UL control channel, wherein the predefined duration is determined according to at least one of a frame index, a subframe index and a transmission period of a subframe of the UL control channel.

13. The method of claim 12, wherein the UL control channel comprises a Channel Quality Indicator (CQI) channel.

14. A Base Station (BS) operation method for power control in a wireless communication system, the method comprising:

assigning an UpLink (UL) control channel to at least one Mobile Station (MS);

determining a frame index and a subframe index of a subframe that includes a Transmit Power Control (TPC) command using at least one of a frame index, a subframe index and a transmission period of the UL control channel; and transmitting a TPC command in the determined frame index and subframe index of the subframe that includes the TPC command.

15. The method of claim 14, wherein the UL control channel comprises a Channel Quality Indicator (CQI) channel.

16. The method of claim 14, wherein the determined frame index and subframe index of the subframe that includes the TPC command are determined by the following equation:

$$TPC_{frame} = i + \text{floor}[(m+P/2)/N]_{frame}$$

$$TPC_{subframe} = (\text{floor}(m+P/2)) \mod N$$

wherein

'i' is a frame index,

'm' is a subframe index,

'P' is a CQI report period and is counted in a unit of subframes,

'N' is a total number of subframes constituting one frame, and

'floor(x)' is a function for outputting the largest integer less than 'x' value, and wherein a first duration between a CQI transmission and a TPC command transmission is not greater than a second duration between the TPC command transmission and a next CQI transmission (first duration≤second duration), and TPC command index is same to the corresponding CQI channel index.

17. The method of claim 14, wherein the determined frame index and subframe index of the subframe that includes the TPC command are determined by the following equation:

$$TPC_{frame} = i + \text{floor}[\text{ceil}(m+P/2)/N]$$

$$TPC_{subframe} = \text{ceil}(m+P/2)) \mod N$$

wherein

'i' is a frame index,

'm' is a subframe index,

'P' is a CQI report period and is counted in a unit of subframes,

'N' is a total number of subframes constituting one frame,

'floor(x)' is a function for outputting the largest integer less than 'x' value, and 'ceil(y)' is a function for rounding off below a decimal point of real number (y), and wherein a first duration between a CQI transmission and a TPC command transmission is at least one of equal to and greater than a second duration between the TPC command transmission and a next CQI transmission (first duration≥second duration), and TPC command index is same to the corresponding CQI channel index.

18. The method of claim 14, wherein the determined frame index and subframe index of the subframe that includes the TPC command are determined by the following equation:

$$TPC_{frame} = i + \text{floor}[\text{ceil}(m+N/2)/N]$$

$$TPC_{subframe} = \text{ceil}(m+N/2)) \mod N$$

wherein
'i' is a frame index,
'm' is a subframe index,
'N' is a total number of subframes constituting one frame,
'floor(x)' is a function for outputting the largest integer less than 'x' value, and
'ceil(y)' is a function for rounding off below a decimal point of real number (y), and wherein
a first duration between a CQI transmission and a TPC command transmission is at least one of equal to and greater than a second duration between the TPC command transmission and a next CQI transmission (first duration≥second duration), and TPC command index is same to the corresponding CQI channel index.

19. The method of claim 14, wherein the determined frame index and subframe index of the subframe that includes the TPC command are determined by the following equation:

$$TPC_{frame}=i \text{ if } (m+R)<N \text{ } i+1 \text{ if } (m+R) \geq N$$

$$TPC_{subframe}=(m+R) \bmod N$$

wherein
'i' is a frame index,
'm' is a subframe index,
'N' is a total number of subframes constituting one frame, and
'R' is a duration between a CQI transmission and a TPC command transmission, and TPC command index is same to the corresponding CQI channel index.

20. The method of claim 14, wherein the determined frame index and subframe index of the subframe that includes the TPC command are determined by the following equation:

$$TPC_{frame}=i+\text{ceil}[P/N/2]$$

$$TPC_{subframe}=\text{floor}[s/T]$$

wherein
'i' is a frame index,
's' is Q*m+q,
'T' is a total number of TPC channels in a DL subframe,
'Q' is a total number of CQI channels in a UL subframe,
'm' is a subframe index,
'q' is an index for an assigned location of a CQI channel for MS,
'P' is a CQI report period and is counted in a unit of subframes,
'N' is a total number of subframes constituting one frame,
'floor(x)' is a function for outputting the largest integer less than 'x' value, and
'ceil(y)' is a function for rounding off below a decimal point of real number (y), and
wherein
'T' is determined by ceil(Q*U/D), 'U' is a total number of UL subframes, and 'D' is a total number of DL subframes, and TPC command index is determined by s mod T.

21. The method of claim 14, wherein the determined frame index and subframe index of the subframe that includes the TPC command are determined by the following equation:

$$TPC_{frame}=i+\text{floor}[P/N/2]+1$$

$$TPC_{subframe}=\text{floor}[s/T]$$

wherein
'i' is a frame index,
's' is Q*m+q,
'T' is a total number of TPC channels in a DL subframe,
'Q' is a total number of CQI channels in a UL subframe,
'm' is a subframe index,
'q' is an index for an assigned location of a CQI channel for MS,
'P' is a CQI report period and is counted in a unit of subframes,
'N' is a total number of subframes constituting one frame, and
'floor(x)' is a function for outputting the largest integer less than 'x' value, and
wherein
'T' is determined by ceil(Q*U/D), 'U' is a total number of UL subframes, and 'D' is a total number of DL subframes, and TPC command index is determined by s mod T.

22. The method of claim 14, wherein the determined frame index and subframe index of the subframe that includes the TPC command are determined by the following equation:

$$TPC_{frame}=i+R$$

$$TPC_{subframe}=\text{floor}[s/T]$$

wherein
'i' is a frame index,
'R' is a duration between a CQI transmission and a TPC command transmission,
's' is Q*m+q,
'T' is a total number of TPC channels in a DL subframe,
'Q' is a total number of CQI channels in a UL subframe,
'm' is a subframe index,
'q' is an index for assigned location of a CQI channel for MS, and
'floor(x)' is a function for outputting the largest integer less than 'x' value, and
wherein
'T' is determined by ceil(Q*U/D), 'U' is a total number of UL subframes, and 'D' is a total number of DL subframes, and TPC command index is determined by s mod T.

23. A Base Station (BS) operation method for power control in a wireless communication system, the method comprising:
assigning an UpLink (UL) control channel to at least one Mobile Station (MS);
determining a frame index and a subframe index of a subframe that includes a Transmit Power Control (TPC) command using at least one of a frame index and a subframe index of the UL control channel; and
transmitting a TPC command in the determined frame index and subframe index of the subframe that includes the TPC command,
wherein the determined frame index and subframe index of the subframe that includes the TPC command are determined by the following equation:

$$TPC_{frame}=i+\text{floor}[(m+N/2)/N]$$

$$TPC_{subframe}=(\text{floor}(m+N/2)) \bmod N$$

wherein
'i' is a frame index,
'm' is a subframe index,
'N' is a total number of subframes constituting one frame, and
'floor(x)' is a function for outputting the largest integer less than 'x' value.

24. A Base Station (BS) operation method for power control in a wireless communication system, the method comprising:

assigning an UpLink (UL) control channel to at least one Mobile Station (MS);
determining a frame index and a subframe index of a subframe that includes a Transmit Power Control (TPC) command using at least one of a frame index and a subframe index of the UL control channel; and
transmitting a TPC command in the determined frame index and subframe index of the subframe that includes the TPC command,
wherein the determined frame index and subframe index of the subframe that includes the TPC command are determined by the following equation:

$$TPC_{frame} = i+1$$

$$TPC_{subframe} = \text{floor}[s/T]$$

wherein
'i' is a frame index,
's' is Q*m+q,
'T' is a total number of TPC channels in a DL subframe,
'Q' is a total number of CQI channels in a UL subframe,
'm' is a subframe index,
'q' is an index for an assigned location of a CQI channel for MS, and
'floor(x)' is a function for outputting the largest integer less than 'x' value,
wherein
'T' is determined by ceil(Q*U/D), 'U' is a total number of UL subframes, and 'D' is a total number of DL subframes, and TPC command index is determined by s mod T.

25. A Base Station (BS) operation method for power control in a wireless communication system, the method comprising:
assigning an UpLink (UL) control channel to at least one Mobile Station (MS), and receiving control information through the UL control channel;
measuring a Signal to Interference plus Noise Ratio (SINR) of the UL control channel; and
during a predefined duration, transmitting a Transmit Power Control (TPC) command considering the measured SINR,
wherein the predefined duration is determined according to at least one of a frame index, a subframe index and a transmission period of a frame of the UL control channel.

26. The method of claim 25, wherein the UL control channel comprises a Channel Quality Indicator (CQI) channel.

27. A Mobile Station (MS) apparatus for power control in a wireless communication system, the MS apparatus comprising:
a Transmit Power Control (TPC) transmission location determiner for determining a frame index and a subframe index of a subframe that includes a TPC command using at least one of a frame index, a subframe index and a transmission period of an UpLink (UP) control channel; and
a controller for assigning the UL control channel, for receiving a TPC command in the determined frame index and subframe index of the subframe that includes the TPC command, and for at least one of increasing and decreasing transmit power.

28. The MS apparatus of claim 27, wherein the UL control channel comprises a Channel Quality Indicator (CQI) channel.

29. The MS apparatus of claim 27, wherein the determined frame index and subframe index of the subframe that includes the TPC command are determined by the following equation:

$$TPC_{frame} = i + \text{floor}[(m+P/2)/N]$$

$$TPC_{subframe} = (\text{floor}(m+P/2)) \bmod N$$

wherein
'i' is a frame index,
'm' is a subframe index,
'P' is a CQI report period and is counted in a unit of subframes,
'N' is a total number of subframes constituting one frame, and
'floor(x)' is a function for outputting the largest integer less than 'x' value, and
wherein
a first duration between a CQI transmission and a TPC command transmission is not greater than a second duration between the TPC command transmission and a next CQI transmission (first duration≤second duration), and TPC command index is same to the corresponding CQI channel index.

30. The MS apparatus of claim 27, wherein the determined frame index and subframe index of the subframe that includes the TPC command are determined by the following equation:

$$TPC_{frame} = i + \text{floor}[\text{ceil}(m+P/2)/N]$$

$$TPC_{subframe} = \text{ceil}(m+P/2)) \bmod N$$

wherein
'i' is a frame index,
'm' is a subframe index,
'P' is a CQI report period and is counted in a unit of subframes,
'N' is a total number of subframes constituting one frame,
'floor(x)' is a function for outputting the largest integer less than 'x' value, and
'ceil(y)' is a function for rounding off below a decimal point of real number (y), and
wherein
a first duration between a CQI transmission and a TPC command transmission is at least one of equal to and greater than a second duration between the TPC command transmission and a next CQI transmission (first duration≥second duration), and TPC command index is same to the corresponding CQI channel index.

31. The MS apparatus of claim 27, wherein the determined frame index and subframe index of the subframe that includes the TPC command are determined by the following equation:

$$TPC_{frame} = i + \text{floor}[\text{ceil}(m+N/2)/N]$$

$$TPC_{subframe} = \text{ceil}(m+N/2)) \bmod N$$

wherein
'i' is a frame index,
'm' is a subframe index,
'N' is a total number of subframes constituting one frame,
'floor(x)' is a function for outputting the largest integer less than 'x' value, and
'ceil(y)' is a function for rounding off below a decimal point of real number (y), and wherein
a first duration between a CQI transmission and a TPC command transmission is at least one of equal to and greater than a second duration between the TPC command transmission and a next CQI transmission (first duration≥second duration), and TPC command index is same to the corresponding CQI channel index.

32. The MS apparatus of claim 27, wherein the determined frame index and subframe index of the subframe that includes the TPC command are determined by the following equation:

$$TPC_{frame}=i \text{ if } (m+R)<N \text{ } i+1 \text{ if } (m+R)\geq N$$

$$TPC_{subframe}=(m+R)\bmod N$$

wherein
'i' is a frame index,
'm' is a subframe index,
'N' is a total number of subframes constituting one frame, and
'R' is a duration between a CQI transmission and a TPC command transmission, and TPC command index is same to the corresponding CQI channel index.

33. The MS apparatus of claim 27, wherein the determined frame index and subframe index of the subframe that includes the TPC command are determined by the following equation:

$$TPC_{frame}=i+\text{ceil}[P/N/2]$$

$$TPC_{subframe}=\text{floor}[s/T]$$

wherein
'i' is a frame index,
's' is Q*m+q,
'T' is a total number of TPC channels in a DL subframe,
'Q' is a total number of CQI channels in a UL subframe,
'm' is a subframe index,
'q' is an index for an assigned location of a CQI channel for MS,
'P' is a CQI report period and is counted in a unit of subframes,
'N' is a total number of subframes constituting one frame,
'floor(x)' is a function for outputting the largest integer less than 'x' value, and
'ceil(y)' is a function for rounding off below a decimal point of real number (y), and
wherein
'T' is determined by ceil(Q*U/D), 'U' is a total number of UL subframes, and 'D' is a total number of DL subframes, and TPC command index is determined by s mod T.

34. The apparatus MS of claim 27, wherein the determined frame index and subframe index of the subframe that includes the TPC command are determined by the following equation:

$$TPC_{frame}=i+\text{floor}[P/N/2]+1$$

$$TPC_{subframe}=\text{floor}[s/T]$$

wherein
'i' is a frame index,
's' is Q*m+q,
'T' is a total number of TPC channels in a DL subframe,
'Q' is a total number of CQI channels in a UL subframe,
'm' is a subframe index,
'q' is an index for an assigned location of a CQI channel for MS,
'P' is a CQI report period and is counted in a unit of subframes,
'N' is a total number of subframes constituting one frame, and
'floor(x)' is a function for outputting the largest integer less than 'x' value, and
wherein
'T' is determined by ceil(Q*U/D), 'U' is a total number of UL subframes, and 'D' is a total number of DL subframes, and TPC command index is determined by s mod T.

35. The MS apparatus of claim 27, wherein the determined frame index and subframe index of the subframe that includes the TPC command are determined by the following equation:

$$TPC_{frame}=i+R$$

$$TPC_{subframe}=\text{floor}[s/T]$$

wherein
'i' is a frame index,
'R' is a duration between a CQI transmission and a TPC command transmission,
's' is Q*m+q,
'T' is a total number of TPC channels in a DL subframe,
'Q' is a total number of CQI channels in a UL subframe,
'm' is a subframe index,
'q' is a index for an assigned location of a CQI channel for MS, and
'floor(x)' is a function for outputting the largest integer less than 'x' value, and
wherein
'T' is determined by ceil(Q*U/D), 'U' is a total number of UL subframes, and 'D' is a total number of DL subframes, and TPC command index is determined by s mod T.

36. A Mobile Station (MS) apparatus for power control in a wireless communication system, the MS apparatus comprising:
a Transmit Power Control (TPC) transmission location determiner for determining a frame index and a subframe index of a subframe that includes a TPC command using at least one of a frame index and a subframe index of an UpLink (UL) control channel; and
a controller for assigning the UL control channel, for receiving a TPC command in the determined frame index and subframe index of the subframe that includes the TPC command, and for at least one of increasing and decreasing transmit power,
wherein the determined frame index and subframe index of the subframe that includes the TPC command are determined by the following equation:

$$TPC_{frame}=i+\text{floor}[(m+N/2)/N]$$

$$TPC_{subframe}=(\text{floor}(m+N/2))\bmod N$$

wherein
'i' is a frame index,
'm' is a subframe index,
'N' is a total number of subframes constituting one frame, and
'floor(x)' is a function for outputting the largest integer less than 'x' value.

37. A Mobile Station (MS) apparatus for power control in a wireless communication system, the MS apparatus comprising:
a Transmit Power Control (TPC) transmission location determiner for determining a frame index and a subframe index of a subframe that includes a TPC command using at least one of a frame index and a subframe index of an UpLink (UL) control channel; and
a controller for assigning the UL control channel, for receiving a TPC command in the determined frame index and subframe index of the subframe that includes the TPC command, and for at least one of increasing and decreasing transmit power, wherein the determined frame index and subframe index of the subframe that includes the TPC command are determined by the following equation:

$$TPC_{frame}=i+1$$

$$TPC_{subframe}=\text{floor}[s/T]$$

wherein
'i' is a frame index,
's' is Q*m+q,
'T' is a total number of TPC channels in a DL subframe,
'Q' is a total number of CQI channels in a UL subframe,
'm' is a subframe index,
'q' is an index for an assigned location of a CQI channel for MS, and
'floor(x)' is a function for outputting the largest integer less than 'x' value, and
wherein
'T' is determined by ceil(Q*U/D), 'U' is a total number of UL subframes, and 'D' is a total number of DL subframes, and TPC command index is determined by s mod T.

38. A Mobile Station (MS) apparatus for power control in a wireless communication system, the MS apparatus comprising:
a controller for assigning an UpLink (UL) control channel from a Base Station (BS), and for transmitting control information through the UL control channel; and
a Transmit Power Control (TPC) transmission location determiner for, during a predefined duration, receiving a TPC command corresponding to the UL control channel,
wherein the predefined duration is determined according to at least one of a frame index, a subframe index and a transmission period of a frame of the UL control channel.

39. The MS apparatus of claim 38, wherein the UL control channel comprises a Channel Quality Indicator (CQI) channel.

40. A Base Station (BS) apparatus for power control in a wireless communication system, the BS apparatus comprising:
a controller for assigning an UpLink (UL) control channel to at least one Mobile Station (MS); and
a Transmit Power Control (TPC) transmission location determiner for determining a frame index and a subframe index of a subframe that includes a TPC command using at least one of a frame index, a subframe index and a transmission period of the UL control channel,
wherein the controller transmits a TPC command in the determined location.

41. The BS apparatus of claim 40, wherein the UL control channel comprises a Channel Quality Indicator (CQI) channel.

42. The BS apparatus of claim 40, wherein a predefined duration of the TPC command is determined by the following equation:

$$TPC_{frame}=i+\text{floor}[(m+P/2)/N]$$

$$TPC_{subframe}=(\text{floor}(m+P/2))\bmod N$$

wherein
'i' is a frame index,
'm' is a subframe index,
'P' is a CQI report period and is counted in a unit of subframes,
'N' is a total number of subframes constituting one frame, and
'floor(x)' is a function for outputting the largest integer less than 'x' value, and
wherein
a first duration between a CQI transmission and a TPC command transmission is not greater than a second duration between the TPC command transmission and a next CQI transmission (first duration≤second duration), and TPC command index is same to the corresponding CQI channel index.

43. The BS apparatus of claim 40, wherein a predefined duration of the TPC command is determined by the following equation:

$$TPC_{frame}=i+\text{floor}[\text{ceil}(m+P/2)/N]$$

$$TPC_{subframe}=\text{ceil}(m+P/2))\bmod N$$

wherein
'i' is a frame index,
'm' is a subframe index,
'P' is a CQI report period and is counted in a unit of subframes,
'N' is a total number of subframes constituting one frame,
'floor(x)' is a function for outputting the largest integer less than 'x' value, and
'ceil(y)' is a function for rounding off below a decimal point of real number (y), and
wherein
a first duration between a CQI transmission and TPC command transmission is at least one of equal to and greater than a second duration between the TPC command transmission and a next CQI transmission (first duration≥second duration), and TPC command index is same to the corresponding CQI channel index.

44. The BS apparatus of claim 40, wherein a predefined duration of the TPC command is determined by the following equation:

$$TPC_{frame}=i+\text{floor}[\text{ceil}(m+N/2)/N]$$

$$TPC_{subframe}=\text{ceil}(m+N/2))\bmod N$$

wherein
'i' is a frame index,
'm' is a subframe index,
'N' is a total number of subframes constituting one frame,
'floor(x)' is a function for outputting the largest integer less than 'x' value, and
'ceil(y)' is a function for rounding off below a decimal point of real number (y), and wherein
a first duration between a CQI transmission and a TPC command transmission is at least one of equal to and greater than a second duration between the TPC command transmission and a next CQI transmission (first duration≥second duration), and TPC command index is same to the corresponding CQI channel index.

45. The BS apparatus of claim 40, wherein a predefined duration of the TPC command is determined by the following equation:

$$TPC_{frame}=i \text{ if } (m+R)<N \text{ } i+1 \text{ if } (m+R)\geq N$$

$$TPC_{subframe}=(m+R)\bmod N$$

wherein
'i' is a frame index,
'm' is a subframe index,
'N' is a total number of subframes constituting one frame, and 'R' is a duration between a CQI transmission and a TPC command transmission, and TPC command index is same to the corresponding CQI channel index.

46. The BS apparatus of claim 40, wherein a predefined duration of the TPC command is determined by the following equation:

$$TPC_{frame}=i+\text{ceil}[P/N/2]$$

$$TPC_{subframe}=\text{floor}[s/T]$$

wherein
'i' is a frame index,
's' is $Q*m+q$,
'T' is a total number of TPC channels in a DL subframe,
'Q' is a total number of CQI channels in a UL subframe,
'm' is a subframe index,
'q' is an index for an assigned location of a CQI channel for MS,
'P' is a CQI report period and is counted in a unit of subframes,
'N' is a total number of subframes constituting one frame,
'floor(x)' is a function for outputting the largest integer less than 'x' value, and
'ceil(y)' is a function for rounding off below a decimal point of real number (y), and
wherein
'T' is determined by ceil(Q*U/D), 'U' is a total number of UL subframes, and 'D' is a total number of DL subframes, and TPC command index is determined by s mod T.

47. The BS apparatus of claim 40, wherein a predefined duration of the TPC command is determined by the following equation:

$$TPC_{frame}=i+\text{floor}[P/N/2]+1$$

$$TPC_{subframe}=\text{floor}[s/T]$$

wherein
'i' is a frame index,
's' is $Q*m+q$,
'T' is a total number of TPC channels in a DL subframe,
'Q' is a total number of CQI channels in a UL subframe,
'm' is a subframe index,
'q' is an index for an assigned location of a CQI channel for MS,
'P' is a CQI report period and is counted in a unit of subframes,
'N' is a total number of subframes constituting one frame, and
'floor(x)' is a function outputting the largest integer less than 'x' value, and
wherein
'T' is determined by ceil(Q*U/D), 'U' is a total number of UL subframes, and 'D' is a total number of DL subframes, and TPC command index is determined by s mod T.

48. The BS apparatus of claim 40, wherein a predefined duration of the TPC command is determined by the following equation:

$$TPC_{frame}=i+R$$

$$TPC_{subframe}=\text{floor}[s/T]$$

wherein
'i' is a frame index,
'R' is a duration between a CQI transmission and a TPC command transmission,
's' is $Q*m+q$,
'T' is a total number of TPC channels in a DL subframe,
'Q' is a total number of CQI channels in a UL subframe,
'm' is a subframe index,
'q' is an index for an assigned location of a CQI channel for MS, and
'floor(x)' is a function for outputting the largest integer less than 'x' value, and
wherein
'T' is determined by ceil(Q*U/D), 'U' is a total number of UL subframes, and 'D' is a total number of DL subframes, and TPC command index is determined by s mod T.

49. A Base Station (BS) apparatus for power control in a wireless communication system, the BS apparatus comprising:
a controller for assigning an UpLink (UL) control channel to at least one Mobile Station (MS); and
a Transmit Power Control (TPC) transmission location determiner for determining a frame index and a subframe index of a subframe that includes a TPC command using at least one of a frame index, a subframe index and a transmission period of the UL control channel,
wherein the controller transmits a TPC command in the determined location,
wherein a predefined duration of the TPC command is determined by the following equation:

$$TPC_{frame}=i+\text{floor}[(m+N/2)/N]$$

$$TPC_{subframe}=(\text{floor}(m+N/2))\bmod N$$

wherein
'i' is a frame index,
'm' is a subframe index,
'N' is a total number of subframes constituting one frame, and
'floor(x)' is a function for outputting the largest integer less than 'x' value.

50. A Base Station (BS) apparatus for power control in a wireless communication system, the BS apparatus comprising:
a controller for assigning an UpLink (UL) control channel to at least one Mobile Station (MS); and
a Transmit Power Control (TPC) transmission location determiner for determining a frame index and a subframe index of a subframe that includes a TPC command using at least one of a frame index, a subframe index and a transmission period of the UL control channel,
wherein the controller transmits a TPC command in the determined location,
wherein a predefined duration of the TPC command is determined by the following equation:

$$TPC_{frame}=i+1$$

$$TPC_{subframe}=\text{floor}[s/T]$$

wherein
'i' is a frame index,
's' is $Q*m+q$,
'T' is a total number of TPC channels in a DL subframe,
'Q' is a total number of CQI channels in a UL subframe,
'm' is a subframe index,
'q' is an index for an assigned location of a CQI channel for MS, and
'floor(x)' is a function for outputting the largest integer less than 'x' value, and wherein
'T' is determined by ceil(Q*U/D), 'U' is a total number of UL subframes, and 'D' is a total number of DL subframes, and TPC command index is determined by s mod T.

51. A Base Station (BS) apparatus for power control in a wireless communication system, the BS apparatus comprising:
a controller for assigning an UpLink (UL) control channel to at least one Mobile Station (MS), and for receiving control information through the UL control channel;
a Signal to Interference plus Noise Ratio (SINR) measurer for measuring an SINR of the UL control channel; and
a Transmit Power Control (TPC) transmission location determiner for, during a predefined duration, transmitting a TPC command considering the measured SINR,
wherein the predefined duration is determined according to at least one of a frame index, a subframe index and a transmission period of a frame of the UL control channel.

52. The BS apparatus of claim 51, wherein the UL control channel comprises a Channel Quality Indicator (CQI) channel.

* * * * *